(12) United States Patent
Llorente Gonzalez

(10) Patent No.: US 7,624,544 B2
(45) Date of Patent: Dec. 1, 2009

(54) TOOL FOR PREVENTING THE VORTEX EFFECT

(75) Inventor: Jose Ignacio Llorente Gonzalez, Pamplona (ES)

(73) Assignee: Gamesa Innovation & Technology, S.L., Sarriguren (ES)

( * ) Notice: Subject to any disclaimer, the term of this patent is extended or adjusted under 35 U.S.C. 154(b) by 307 days.

(21) Appl. No.: 11/886,710

(22) PCT Filed: Mar. 28, 2006

(86) PCT No.: PCT/ES2006/000148

§ 371 (c)(1),
(2), (4) Date: Sep. 19, 2007

(87) PCT Pub. No.: WO2006/106162

PCT Pub. Date: Oct. 12, 2006

(65) Prior Publication Data

US 2009/0019791 A1  Jan. 22, 2009

(30) Foreign Application Priority Data

Apr. 5, 2005  (ES)  ................................ 200500916

(51) Int. Cl.
*B61D 17/02* (2006.01)
(52) U.S. Cl. .................. 52/84; 52/247; 52/248
(58) Field of Classification Search .................. 52/84, 52/247, 248
See application file for complete search history.

(56) References Cited

U.S. PATENT DOCUMENTS

| | | | | |
|---|---|---|---|---|
| 1,618,531 A | * | 2/1927 | Hampton | 137/142 |
| 1,660,442 A | * | 2/1928 | Hampton | 137/147 |
| 2,648,201 A | * | 8/1953 | Marancik et al. | 141/59 |
| 2,720,219 A | * | 10/1955 | Grove et al. | 137/630.19 |
| 2,949,265 A | * | 8/1960 | Person | 244/135 A |
| 3,025,992 A | * | 3/1962 | Humphrey | 220/565 |
| 3,199,553 A | * | 8/1965 | Garrett et al. | 141/388 |

(Continued)

FOREIGN PATENT DOCUMENTS

JP  8-199852  8/1996

(Continued)

OTHER PUBLICATIONS

English abstract of JP 2000-8648 dated Jan. 11, 2000.

(Continued)

*Primary Examiner*—Brian E Glessner
(74) *Attorney, Agent, or Firm*—Ladas and Parry LLP

(57) ABSTRACT

The invention relates to a tool for preventing the vortex effect, comprising three corrugated tubes which extend helically from the upper end (2) of the tower (3), such as to cover only the upper part thereof. The helix pitch defined by the corrugated tube (1) along the length of the tower (3) is fixed using cords (5) which are attached at each revolution of the tube. The corrugated tube (1) is lifted with a cathead (6) which is disposed on the structure that is used to anchor (4) the tool to the tower (3), the structure comprising three T-shaped sections which form an X having sectors (9) fixed to the ends thereof. In addition, four legs (14) are welded to the aforementioned sectors and the tubes are wound around said legs.

6 Claims, 3 Drawing Sheets

U.S. PATENT DOCUMENTS

| | | | | |
|---|---|---|---|---|
| 3,448,222 A | * | 6/1969 | Greber | 174/42 |
| 3,454,051 A | * | 7/1969 | Goepfert et al. | 138/178 |
| 3,461,916 A | * | 8/1969 | Ledgerwood, Jr. | 138/120 |
| 3,581,449 A | * | 6/1971 | Huber et al. | 52/84 |
| 3,884,173 A | * | 5/1975 | Fabula | 114/243 |
| 3,913,668 A | * | 10/1975 | Todd et al. | 166/359 |
| 3,991,550 A | * | 11/1976 | Cohen | 57/212 |
| 4,067,202 A | * | 1/1978 | Reed | 405/224.2 |
| 4,130,134 A | * | 12/1978 | Castle | 137/615 |
| 4,180,369 A | | 12/1979 | Ottosen | |
| 4,182,591 A | * | 1/1980 | Stanelle | 414/291 |
| 4,279,544 A | * | 7/1981 | Brun et al. | 405/202 |
| 4,391,297 A | * | 7/1983 | Knight | 137/615 |
| 4,456,073 A | * | 6/1984 | Barth et al. | 166/367 |
| 4,690,181 A | * | 9/1987 | Carrio | 141/388 |
| 4,722,367 A | * | 2/1988 | Swink et al. | 138/178 |
| 6,019,549 A | * | 2/2000 | Blair et al. | 405/216 |
| 6,561,734 B1 | * | 5/2003 | Allen et al. | 405/216 |
| 6,565,287 B2 | * | 5/2003 | McMillan et al. | 405/211.1 |
| 6,695,540 B1 | * | 2/2004 | Taquino | 405/216 |
| 6,784,566 B2 | * | 8/2004 | Thomas | 290/55 |
| 6,896,447 B1 | * | 5/2005 | Taquino | 405/216 |
| 6,953,308 B1 | * | 10/2005 | Horton | 405/211 |
| 7,163,062 B2 | * | 1/2007 | Sele | 166/367 |
| 2003/0213113 A1 | * | 11/2003 | McMillan et al. | 29/281.1 |
| 2005/0175415 A1 | * | 8/2005 | McMillan et al. | 405/211 |

FOREIGN PATENT DOCUMENTS

| | | | |
|---|---|---|---|
| JP | 10103216 A | * | 4/1998 |
| JP | 2000-8648 | | 1/2000 |

OTHER PUBLICATIONS

English abstract of JP 8-199852 dated Aug. 6, 1996.

* cited by examiner

TOOL FOR PREVENTING THE VORTEX EFFECT

SUBJECT OF THE INVENTION

The subject of this invention is a tool for preventing the vortex effect which provisionally when the tower has the nacelle removed during assembly or repair work, and is comprised of three corrugated tubes which are extended helically along the last section of the tower. Once laid in their position each of the corrugated tubes are anchored, either to the ground or to the base of the tower, with the cords that were used to extend the corrugated tubes.

BACKGROUND OF THE INVENTION

The vortex effect is the cause of vortices being generated on structures exposed to the circulation of a fluid which manifests in the form of vibrations. This effect is caused by the impacting wind and particularly affects the last section of towers when they have no nacelle due to repair and assembly work.

On these occasions, the vibrations may coincide with the natural frequencies of the tower thus amplifying the oscillations of the structure to the point of endangering the tower itself.

A comparison between existing patents and the subject of the present invention has resulted in infinity of methods for tackling the vortex effect issue although none of the studied patents are based on the use of a provisional tool. The most relevant patents obtained from the state of the art study are:

U.S. Pat. No. 4,180,369 incorporating a rigid metal helical strip on the tower itself, which does not have provide an option for removal and makes the manufacture of the tower itself more expensive.

Patent WO9819018 improves on the aforementioned patent using flexible materials screwed to the element requiring protection. The main difference is that these helices are designed to work underwater.

Patent JP2000265708 incorporates a large number of rods fixed by rings and arranged around the tower.

And finally, U.S. Pat. No. 3,581,449 equips the tower with rings and protruding elements, patent GB2362938 has semi-spherical protruding elements and U.S. Pat. No. 4,059,129 installs plates of different shapes.

It is understood from the aforementioned, that none of the analysed patents are similar to the tool for preventing the vortex effect which is the subject of this invention, one may also conclude that said tool is novel as it unhooks a corrugated tubular structure from the upper part of the wind turbine tower to be extended helically, due to its method for anchoring the tool structure to the tower and securing the same one extended, and also due to this being a provisional solution used during the period in which the tower does not have the nacelle installed.

DESCRIPTION

In cases where the tower of the wind turbine is not equipped with the nacelle due to maintenance or assembly tasks, a certain factor which may damage the tower structure must be considered. This factor is the exposure to vibrations induced by eddy shedding in a transversal direction and in cases in which the exciting frequency of the wind coincides with the natural frequency of the tower oscillations extensive oscillations may occur, resulting in an increase to the fatigue stresses suffered by the tower.

In order to avoid the vortex effect and to decrease the risk of faults, a tool has been designed which, when installed, breaks the turbulences generated, thus preventing said turbulences being added to the tower's own frequency.

This tool is formed by a corrugated tubular structure which is fixed on the top of the tower using an anchoring system and which is later extended in such a manner that said tool is wrapped around the final section of the tower. The tubes are extended with four cords. Two operators pull the cords from the base of the tower whilst another operator gradually releases the hoisting system cathead at the top of the tower in order to prevent the tubes from falling brusquely.

The helix pitch marked by the tubes along the upper section of the tower is guided by the cords which are tied to each revolution of the tube. Each tube has a helix pitch of P, whilst the group of the three tubes forms a helix pitch of P/3.

The tool is anchored to the tower by means of a structure which covers the tower on the outside and is screwed to the tower on the upper part by using the same orifices used to secure the nacelle.

Any movement of the tubular structure is prevented by anchoring the cords either to the ground or to the base of the tower. Finally, once the helix of the tube is formed and secured, the tool is covered with a canvas which is secured with conventional methods to the orifices of the flange.

DESCRIPTION OF THE PREFERRED EMBODIMENT

Figure 1:
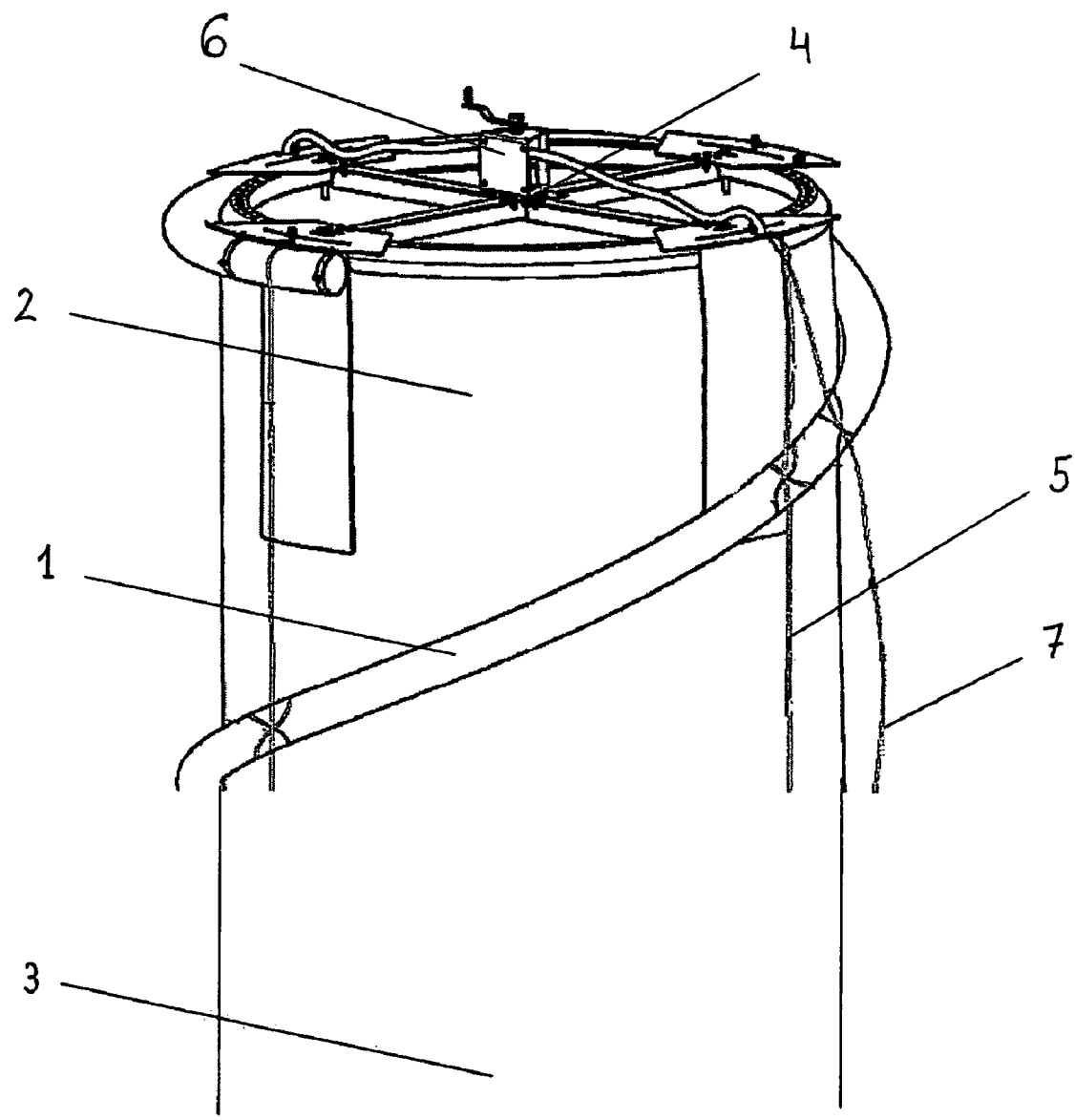
FIG. 1 shows a general view of the tool installed on a tower, with one of the three corrugated tubes extended upon said tower.

As shown in the enclosed figures, the tool for preventing the vortex effect is comprised by a corrugated tubular structure (1) which is anchored to the upper end (2) of the tower (3) by means of an anchoring structure (4) and extends helically to become coiled around the final section of the tower (3).

The tool has two mechanisms: one for retracting the tubes and another for extending the tubes. The tube extending mechanism is formed by a preferred number of four cords (5), which are secured to the support. The tube hoisting mechanism is formed by three cables (7) which are wound on the cathead (6) located in the centre of the anchoring tool (4).

The tube (1) is guided by means of the four cords (5) which are extended and tied to each tube revolution, to finally be anchored at the base of the tower (3) securing the helix pitch along the same.

One operator releases the cathead (6) whilst other operators on the ground handle the cords so that the corrugated tube (1) is extended over the tower (3) with the correct helical form. The extension of the tool over the tower (3) with a correct helix pitch is performed more effectively with the anti-vortex action of said tool. On each revolution and for each of the tubes, the cord is tied to ensure that the helix is formed when the tube is extended. As there are three different tubes, the pitch of each tube is three times that to the helix formed by the group of tubes.

Figure 2:
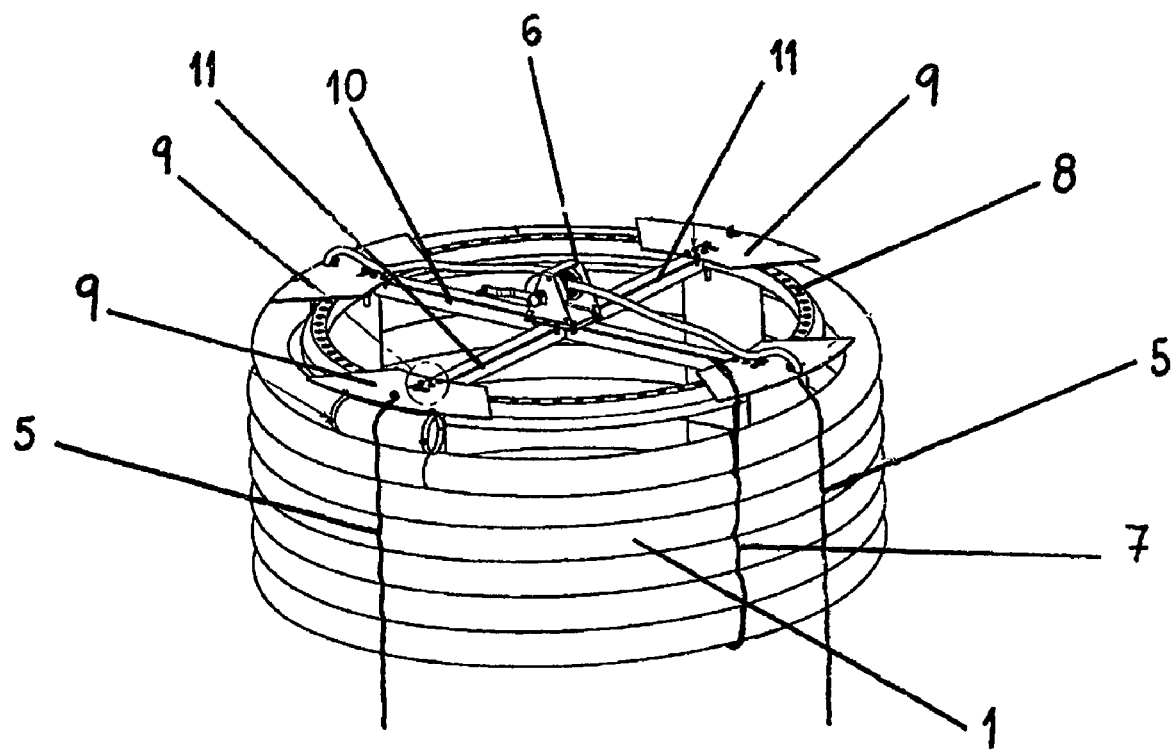
FIG. 2 represents the tool for preventing the vortex effect that is the subject of this invention whilst retracted and coiled.

The three cables (7) used for hoisting the tubes are wound on the cathead (6), with each cable being passed through pulleys, each arranged at 120°, and through rings secured to the tubes on each section. Said hoisting cables (7) are tied to the final section of the tubes after having been passed through the rings of the previous sections in such a manner that, during retraction, the last tube pushes up on the previous tubes until the hoisting operation is complete, as shown in FIG. 2.

Figure 3:
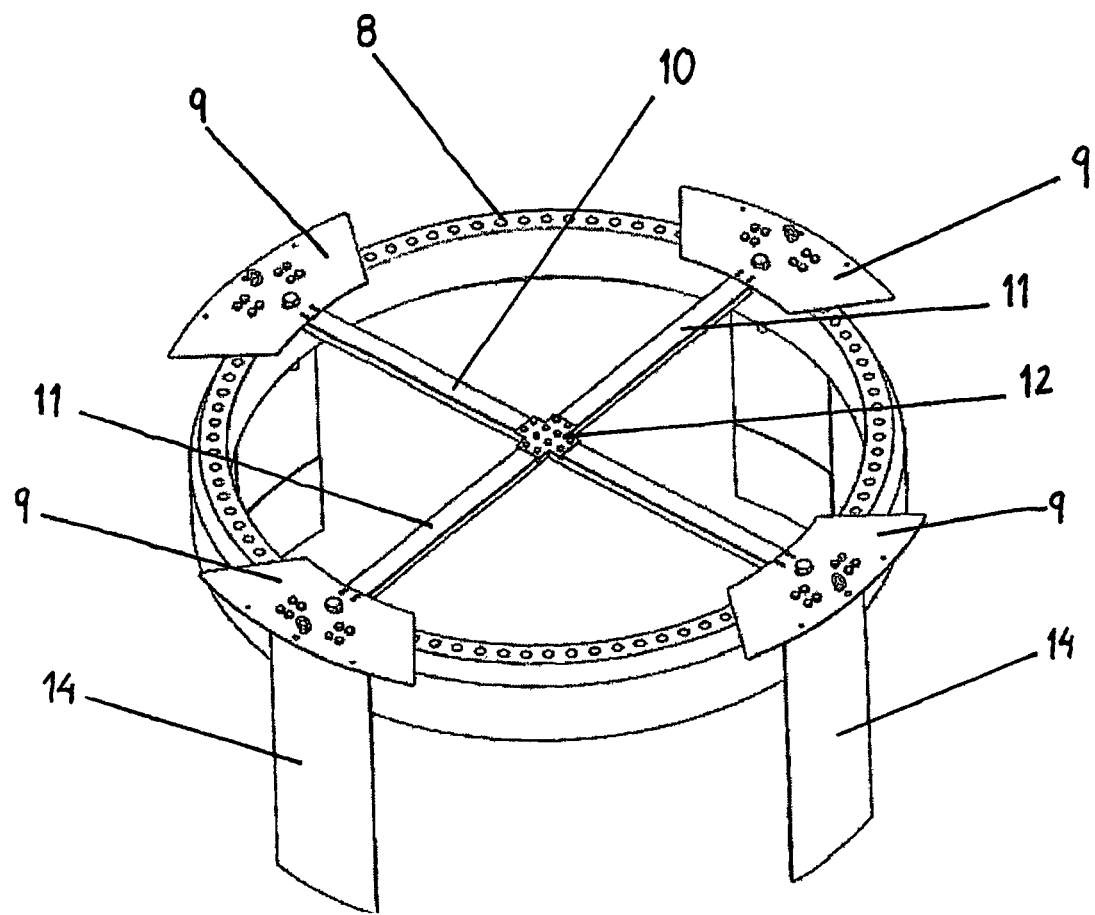
FIG. 3 represents the structure for anchoring the tool to the tower together with the flange of the aforementioned tower.

In FIG. 3, the tool is anchored to the tower (3) by means of an anchoring structure (4) which covers the diameter of the tower (3) on the upper end (2) of the same and is secured by means of conventional anchoring fixtures in the same orifices as those used to anchor the nacelle.

The tool anchoring structure (4) is formed by a preferred number of four sectors (9) made of metal material which are joined together by a T-shaped section (10) and a further two T-shaped sections (11) with a length of approximately half that of the first profile (10), said profiles (11) are joined together in the centre by a reinforcing star (12).

The tool is anchored to the tower (3) by means of screws which pass through the orifices (8) on the upper part of the tool and are secured to the upper part of the tower using the same orifices (not shown in the figures) that are used for securing the nacelle.

The legs (14) of the structure (4) are welded to each sector (9), said legs have a curved shape and the corrugated tube (1) is coiled around them.

The invention claimed is:

1. A tool for preventing the vortex effect formed by an element which is helically extended around a tower covering a portion thereof and starting from an upper end of the tower, the tool comprising three corrugated tubes which extend in the form of a helix from the upper end of the tower and coil around the tower to a final section of the tower and wherein the tubes are extended using a plurality of cords that are secured on each rotation of the tube, and leaving loose cord between tube and tube in order to form a helix pitch, all of which is tied to an anchoring structure located on the upper end of the tower.

2. The tool for preventing the vortex effect, in accordance with claim one, wherein cables which hoist the corrugated tubes extend along the tower and are actioned by a cathead located in the center of the anchoring structure which anchors the tool to the tower.

3. The tool for preventing the vortex effect, in accordance with claim one, wherein the corrugated tubes extend around the tower and are guided and handled from the base of the tower by four cords and are finally anchored to a base of the tower.

4. The tool for preventing the vortex effect, in accordance with claim one, wherein the tool is anchored to the tower by means of the anchoring structure located on the upper end of the tower and secured to said tower by fastening means in orifices used to secure a nacelle.

5. The tool for the preventing the vortex effect, in accordance with claim four, the anchoring structure for anchoring the tool to the tower is comprised of four sectors joined together by three T-shaped sections and secured in the center of the anchoring structure by a reinforcing star.

6. The tool for preventing the vortex effect, in accordance with claim five, wherein curved legs are welded to the anchoring structure on each with the corrugated tube being wound around said legs when retracted.

* * * * *